No. 814,295. PATENTED MAR. 6, 1906.
J. W. KELLY.
PIPE FITTING.
APPLICATION FILED NOV. 23, 1905.
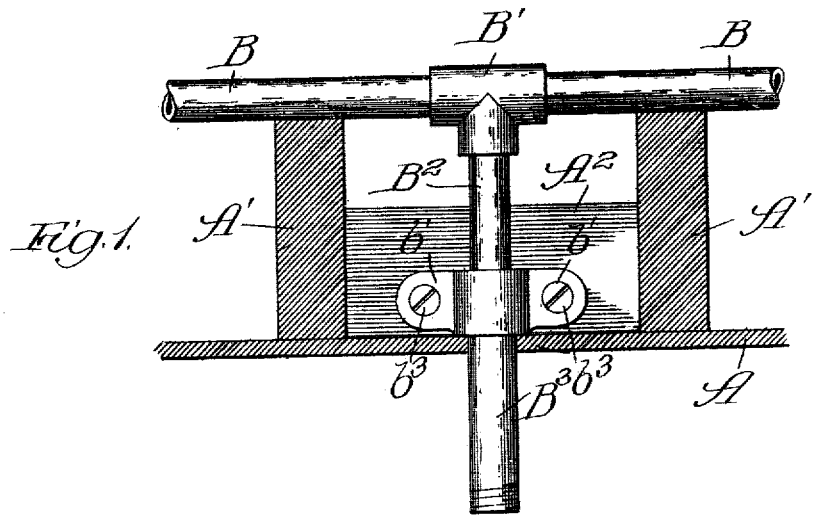
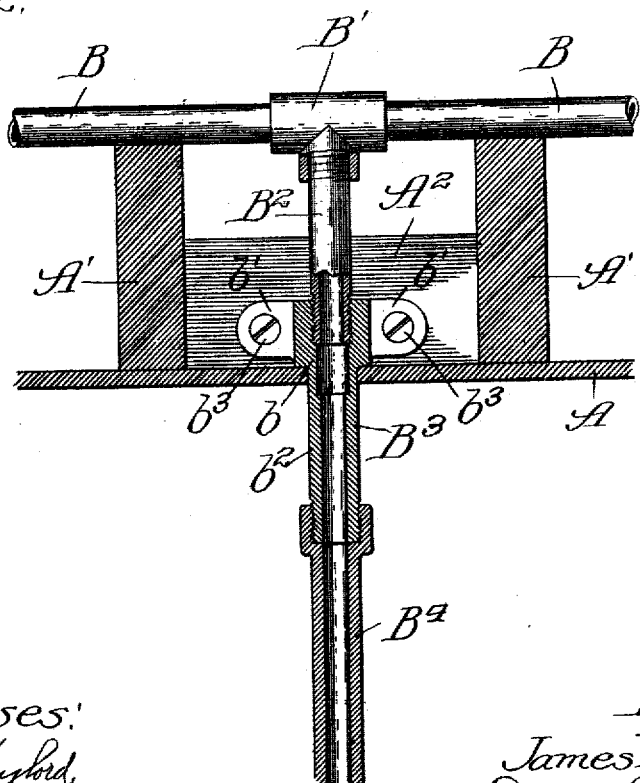
Witnesses:
Inventor,
James W. Kelly,

UNITED STATES PATENT OFFICE.

JAMES W. KELLY, OF CHICAGO, ILLINOIS.

PIPE-FITTING.

No. 814,295.     Specification of Letters Patent.     Patented March 6, 1906.

Application filed November 23, 1905. Serial No. 288,680.

*To all whom it may concern:*

Be it known that I, JAMES W. KELLY, a citizen of the United States, residing at Chicago, in the county of Cook and State of Illinois, have invented a new and useful Improvement in Pipe-Fittings, of which the following is a specification.

My invention relates particularly to pipe-fittings for use in connection with chandelier-pipes; and my primary object is to provide a fitting which will serve as a means of connection between a gas-supply pipe or main located above a ceiling and the chandelier-pipe depending from the ceiling. The construction is adapted to permit the chandelier-pipe to depend directly beneath the supply pipe or main and to insure such a secure connection as will obviate danger of injury to the connections at the supply-pipe in hanging or removing chandeliers.

The invention is illustrated in the accompanying drawings, in which—

Figure 1 represents a sectional view of a ceiling and a supply-pipe supported above the same and equipped with my improved fitting adapted for receiving a chandelier-pipe; and Fig. 2, a view similar to Fig. 1, but showing the fitting in section and having connected with it the upper end of a chandelier-pipe.

In the construction shown, A represents a ceiling; A', the joists above the ceiling; $A^2$, a cross member joining the joists; B, a gas-supply pipe or main equipped with a T-fitting B'; $B^2$, a depending pipe-section connected with the fitting B'; $B^3$, my improved pipe-fitting, which may be termed a "ceiling-pipe" fitting, and $B^4$ a chandelier-pipe depending from the fitting $B^3$.

The fitting $B^3$ comprises in integral formation a tubular head $b$, having perforate ears $b'$, and a depending tubular shank $b^2$. The tubular head is internally threaded to receive the pipe-section $B^3$, and the head is securely fastened to the cross member $A^2$ by means of screws or studs $b^3$. The lower end of the stem $b^2$ is externally threaded and has screwed onto it the internally-threaded upper end of the pipe $b^4$. Inasmuch as the head $b$ is firmly secured to the cross member $A^2$ it will be obvious that the fitting cannot be turned in the operation of applying or removing a chandelier-fixture, so that there will be no danger of disturbing the connection between the pipe-section $B^2$ and the fitting B'. Preferably the upper end of the pipe-section $B^2$ is oppositely threaded to the lower end, thereby making the pipe-section $B^2$ a right and left threaded union. This enables the parts to be joined, even though the head $b$ be located adjacent to a joist, as sometimes happens where the center of the room comes at the joist. Where this occurs, the head is secured directly to a joist instead of to the cross member.

From the description given it will be seen that the vertical pipe may be safely caused to depend directly beneath the horizontal pipe and that no injury to the connection with the horizontal pipe can occur, which injury might on account of the inaccessibility of the joint prove a source of great danger, as well as a great expense in effecting repair. Heretofore it has been common for those in authority to forbid the use of vertical pipes depending directly from the horizontal supply-pipe on account of the great danger, and this has rendered necessary heretofore the use of pipes projecting laterally from the supply-pipe and having bends therein to provide the vertical section requisite for the connection of the chandelier-pipe. Even this construction has been insecure, besides being more expensive and otherwise objectionable. The new construction overcomes all objections, is cheap, readily applied, and perfectly adapted to its purpose.

What I regard as new, and desire to secure by Letters Patent, is—

1. The combination of a horizontal pipe, a pipe-section depending therefrom, and a pipe-fitting comprising, in integral formation, a tubular head and shank, said head having an internal thread receiving the lower end of said pipe-section and equipped with ears for connection with the frame member of a building, the shank of said fitting adapted to project through a ceiling and provided with a thread for the reception of a chandelier-pipe.

2. The combination of frame members and a ceiling beneath said frame members, of a horizontal pipe supported on a frame member and equipped with a T-fitting, a depending pipe-section having screw connection therewith, a pipe-fitting comprising, in integral formation, a tubular head equipped with perforate ears and a tubular shank projecting through the ceiling, said tubular head having an internal screw-thread connected with the lower end of said pipe-section and the lower end of said tubular shank being externally threaded to receive a chandelier-pipe, and studs connecting said ears securely to a frame member, thereby to prevent rotation of said second-named fitting, for the purpose set forth.

JAMES W. KELLY.

In presence of—
A. U. THORIEU,
J. H. LANDES.